United States Patent
Meloche

(10) Patent No.: US 9,634,911 B2
(45) Date of Patent: Apr. 25, 2017

(54) COMMUNICATION DEVICE EVENT CAPTURES

(71) Applicant: Avaya Inc., Basking Ridge, NJ (US)

(72) Inventor: Jean Meloche, Madison, NJ (US)

(73) Assignee: Avaya Inc., Santa Clara, CA (US)

( * ) Notice: Subject to any disclaimer, the term of this patent is extended or adjusted under 35 U.S.C. 154(b) by 279 days.

(21) Appl. No.: 13/954,490

(22) Filed: Jul. 30, 2013

(65) Prior Publication Data

US 2015/0039747 A1    Feb. 5, 2015

(51) Int. Cl.
*G06F 15/173* (2006.01)
*H04L 12/26* (2006.01)
*H04L 29/06* (2006.01)
*G06F 11/34* (2006.01)
*H04L 12/721* (2013.01)
*H04L 12/24* (2006.01)

(52) U.S. Cl.
CPC .......... *H04L 43/04* (2013.01); *G06F 11/3495* (2013.01); *H04L 29/06* (2013.01); *H04L 41/069* (2013.01); *H04L 45/40* (2013.01)

(58) Field of Classification Search
USPC ........ 709/229, 223, 224, 220; 370/392, 390, 370/401; 702/85, 189; 719/310
See application file for complete search history.

(56) References Cited

U.S. PATENT DOCUMENTS

| | | | | |
|---|---|---|---|---|
| 6,128,298 A * | 10/2000 | Wootton | ............. | H04L 12/4604 370/390 |
| 7,487,508 B2 * | 2/2009 | Fu | ........................... | H04L 29/06 709/220 |
| 7,996,172 B2 * | 8/2011 | Bauer et al. | .................... | 702/85 |
| 8,793,358 B1 * | 7/2014 | Godbole | ................. | H04L 45/40 709/223 |
| 2003/0217162 A1 * | 11/2003 | Fu | ........................... | H04L 29/06 709/229 |
| 2005/0069101 A1 * | 3/2005 | Bear | .................... | H04M 1/2473 379/88.17 |
| 2009/0177427 A1 * | 7/2009 | Bauer | .................... | G06F 19/366 702/85 |
| 2010/0161787 A1 * | 6/2010 | Jones | .................. | G06F 11/3495 709/224 |

\* cited by examiner

*Primary Examiner* — Kyung H Shin
(74) *Attorney, Agent, or Firm* — Sheridan Ross P.C.

(57) ABSTRACT

A user interaction or a timer event is detected in a communication device. A timestamp is associated with the user interaction or the timer event. In response to detecting the user interaction or the timer event in the communication device, the user interaction or the timer event and the timestamp are stored in a packet log file associated with the communication device. The packet log file can also include a packet trace of packets that are sent to and received by the communication device. This allows the user interactions and/or the timer events to be displayed chronologically in relation to the packets sent to and received by the communication device.

20 Claims, 6 Drawing Sheets

COMMUNICATION DEVICE EVENT CAPTURES

TECHNICAL FIELD

The systems and methods that relate to network monitoring systems and in particular to monitoring events in communication devices.

BACKGROUND

Network monitoring systems are very useful in identifying problems in communication networks. Today's network monitoring systems include the capabilities of being able to capture packet traffic at various points in the communication network. For example, a network sniffer can be placed by a communication device to capture all the packets that are sent to and from the communication device.

However, just capturing a packet trace of a communication session does not necessarily allow a service technician to quickly identify what is causing a particular problem. Many times, an event that occurs in the communication device may be the key to identifying a problem that caused a failure of a communication session. For example, events such as timer events or user interaction events may be causing a communication failure. What is needed is a solution that fully integrates these types of events into a packet log file to allow a better solution for debugging communication failures.

SUMMARY

Systems and methods are provided to solve these and other problems and disadvantages of the prior art. A user interaction or a timer event is detected in a communication device. A timestamp is associated with the user interaction or the timer event. In response to detecting the user interaction or the timer event in the communication device, the user interaction or the timer event and the timestamp are stored in a packet log file associated with the communication device. The packet log file can also include a packet trace of packets that are sent to and received by the communication device. This allows the user interactions and/or the timer events to be displayed chronologically in relation to the packets sent to and received by the communication device.

DETAILED DESCRIPTION

Figure 1:
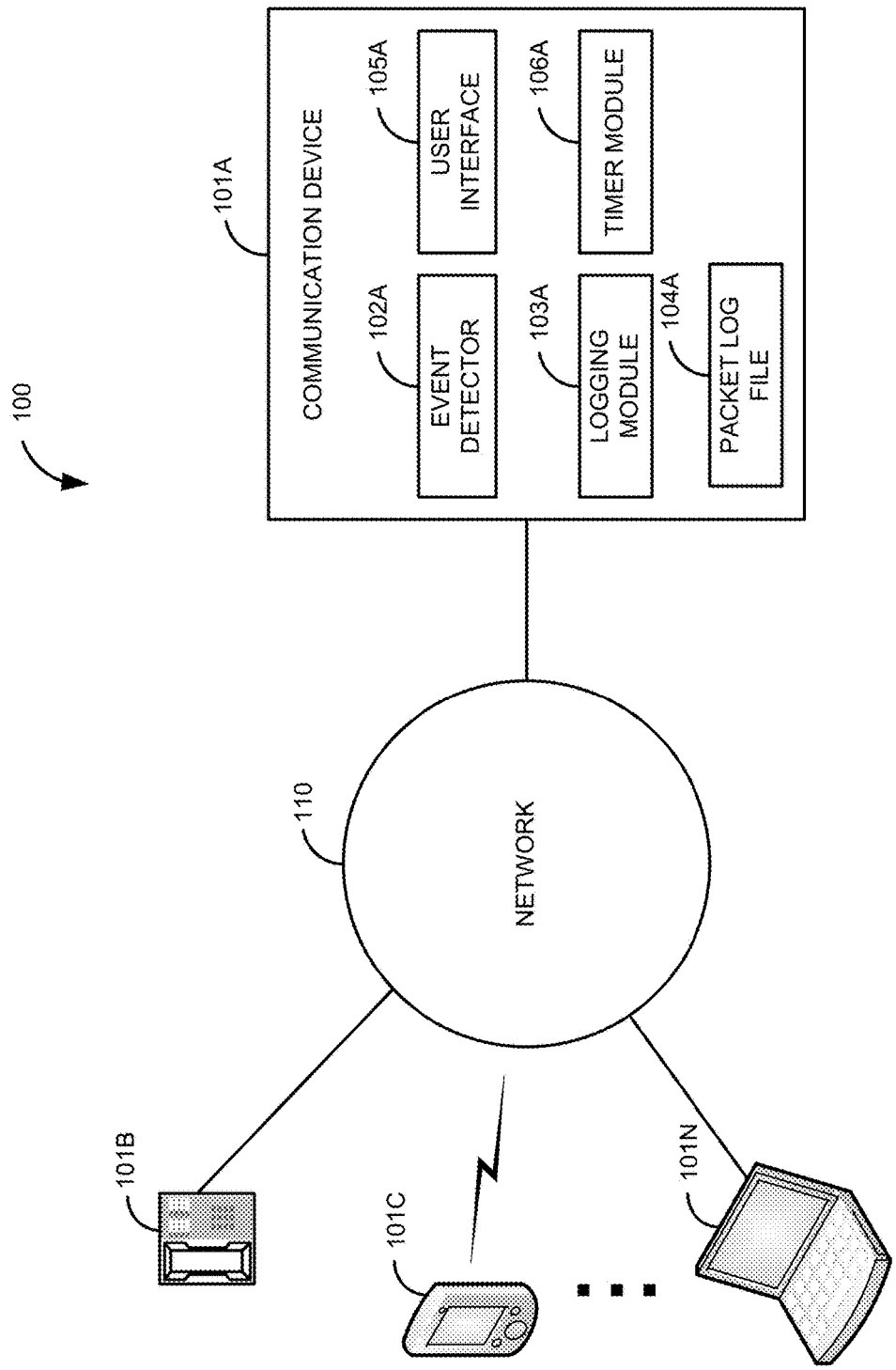
FIG. 1 is a block diagram of a first illustrative system for capturing events in a communication device.

FIG. 1 is a block diagram of a first illustrative system 100 for capturing events in a communication device 101. The first illustrative system 100 comprises communication devices 101A-101N and the network 110.

The network 110 can be any network that can send and receive information, such as the Internet, a Wide Area Network (WAN), a Local Area Network (LAN), the Public Switched Telephone Network (PSTN), a packet switched network, a circuit switched network, a cellular network, a combination of these, and the like. The network 110 can use a variety of protocols, such as Ethernet, Internet Protocol (IP), Session Initiation Protocol (SIP), Integrated Services Digital Network (ISDN), H.323, video protocols, and the like.

The network 110 is used by the communication devices 101A-101N to establish communication sessions, such as voice communications, video communications, text communications, and/or the like. The communication devices 101A-101N can communicate on the network typically using packet communications; however, in some embodiments, some of the communication devices 101A-101N may communicate using circuit switched protocols. The network 110 comprises various switching and routing elements as known in the art.

The communication device 101 may be any device that can communicate on the network 110, such as a Personal Computer (PC), a telephone, a video system, a cellular telephone, a Personal Digital Assistant (PDA), a tablet device, a notebook device, a printer, a scanner, a FAX machine, a video camera, a camera, a server, a gateway, a communication system, and/or the like. As shown in FIG. 1, any number of communication devices 101A-101N may be connected to network 110, including only a single communication device 101.

The communication device 101A further comprises an event detector 102A, a logging module 103A, a packet log file 104A, a user interface 105A, and a timer module 106A. The event detector 102A can be any hardware/software that can detect an event. The logging module 103A can be any hardware/software that can log information. The packet log file 104A can be any file that can store information, such as a database, a file, a file structure, and/or the like.

The user interface 105A can be any type of user interface that allows a user to interact with the communication device 101A. The user interface 105A can include elements for providing user input, such as a keyboard, a keypad, a touch screen, a mouse, a track ball, a touch pad, a button, a microphone, a video camera, and/or the like. The user interface 105A can also include elements for providing information to a user, such as a touch screen, a display, Cathode Ray Tube (CRT), a television, a monitor, a speaker, a Light Emitting Diode (LED), a lamp, and/or the like.

The timer module 106A can be any hardware/software that can generate time or timer events. For example, the timer module 106A can comprise an interrupt service routine that gets called when a hardware timer expires.

In FIG. 1, only the communication device 101A is shown to comprise the elements 102A-106A. However, the other communication devices 101B-101N can comprise the elements 102-106.

The event detector 102A is configured to detect a user interaction and/or a timer event. A user interaction can be an interaction where input is received from a user of the communication device 101A. For instance, the user interaction can be a keypad press, a button push, a typing on a keyboard, a voice command, a selection by the user, a gesture, and/or the like. The user interaction can be an interaction that is provided to the user, such as a visual indication of a status, an audio indication of a status, a state of a display, a state of a status indicator, an indication of a caller ID, a ringing, a dial tone, a voice mail indicator, and/or the like.

The timer event can be any timer event that is associated with the communication device 101A, such as a packet timer event, a power conservation timer event, a packet resend timer event, a packet response timer event, a back-off timer event, an input response timer event, a watchdog timer event, and/or the like. A packet timer event can be any event that is associated with a packet timer, such as a packet delay timer, a packet resend timer, a packet processing timer, and/or the like. The power conversation timer can be any timer that is used to conserve power in the communication device 101A, such as a timer that dims or turns off a display, a timer that powers down different hardware elements in the communication device 101A, and/or the like. The packet resend timer can be any timer that is used for resending packets. The packet response timer can be any timer that measures packet response times. The back-off timer can be any timer that determines a back-off time, such as an Ethernet back-off timer for packet collisions. The input response timer can be any timer that can determine the time it takes a user to provide input. The watch dog timer is any timer that resets the communication device 101A based on an error condition.

The event detector 102A associates a timestamp with the user interaction and/or the timer event. For example, if the event occurred at 7:21.06 A.M. on Friday Aug. 13, 2012, the user interaction and/or the timer event will be stored with the time that the event occurred. The logging module 103A, in response to detecting the user interaction and/or the timer event, stores the user interaction and/or the timer event into the packet log file 104A.

To illustrate, consider the following examples. A user at the communication device 101A pushes the speaker phone button on the user interface 105A. The event detector 102A detects the push of the speakerphone button on the communication device 101A. The event detector 102A associates a time of when the speakerphone button was pushed with the push of the speakerphone button. The logging module 103A stores the time the speakerphone button was pushed along with information indicating that the speakerphone button was pushed in the packet log file 104A.

In another exemplary embodiment, the user uses a voice command as input to the communication device 101A. The user says to the communication device 101A, "call Dave Jones." The event detector detects the voice command and associates a timestamp of when the voice command was given. The logging module 103A stores the timestamp and information describing the voice command in the packet log file 104A.

In another exemplary embodiment, an incoming voice call is received by the communication device 101A. In response to receiving the incoming call, the communication device 101A provides a ringing sound to the user to indicate that the incoming call has been received via the user interface 105A. The event detector 102A detects the ringing (the user interaction) and when the ringing ends. The event detector 102A associates a timestamp with when the ringing started and/or ended. The logging module 103A stores the timestamp(s) along with information that indicates that the ringing sound was played to the user in the packet log file 104A.

In another exemplary embodiment, a message is left with the user's voice mail system. A message is received by the communication device 101A to turn on a message waiting Light Emitting Diode (LED) on the communication device 101A. The event detector 102A detects the turning on of the message waiting LED. The event detector 102A associates a timestamp with when the message waiting LED was turned on. The logging module 103A stores the timestamp and information that indicates that the message waiting LED was turned on in the packet log file 104A.

In another exemplary embodiment, the timer module 106A is a watchdog timer that is used to reset the communication device 101A when a software problem occurs in the communication device 101A. When the watchdog timer expires, the event detector 102A detects the watchdog timer event. The event detector 102A associates a timestamp with when the watchdog timer expired. The logging module 103A stores the timestamp and information indicating that the watchdog timer expired in the packet log file 104A.

In yet another exemplary embodiment, the timer module 106A is a power conservation timer. After a usage of the communication device 101A, the power conservation timer is started. After a period of time, if there is no use of the communication device 101A, the communication device 101A turns off a display and/or powers down part of the user interface 105A and/or some circuitry in the communication device to conserve power. The event detector 102A detects the expiration of the conservation timer. The event detector associates a timestamp of when the communication device 101A was placed in the powered down state. The logging module 103A stores the timestamp and the power conservation event in the packet log file 104A.

Figure 2:
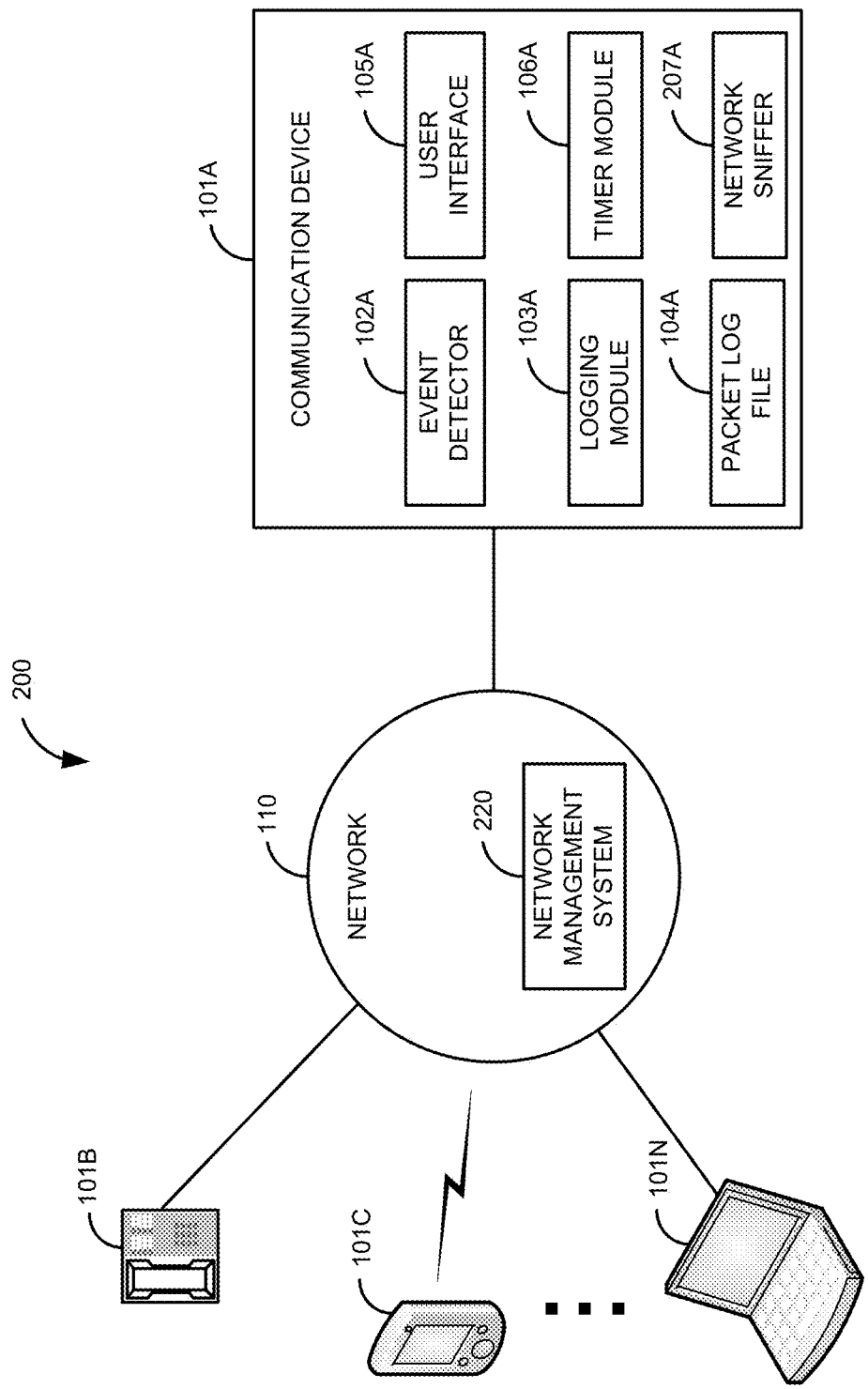
FIG. 2 is a block diagram of a second illustrative system for capturing events in a communication device.

FIG. 2 is a block diagram of a second illustrative system 200 for capturing events in a communication device 101. The second illustrative system 200 comprises the communication devices 101A-101N and the network 110.

The network 110 further comprises a network management system 220. The network management system 220 can be any hardware/software that can be used to manage and/or troubleshoot devices on the network 110. The network management system 220 can have multiple elements in the network 110, such as a network sniffer 207. The network management system 220 can use known protocols such as Simple Network Management Protocol (SNMP) to query the status or get the packet log files 104A of the communication device 101A.

The communication device 101A comprises the event detector 102A, the logging module 103A, the packet log file 104A, the user interface 105A, the timer module 106A, and the network sniffer 207A. The network sniffer 207A can be any hardware/software that can capture packets sent to and from the communication device 101A. The network sniffer 207A can capture the packets sent to and from the communication device and store the results in a packet trace in the packet log file 104A. The packet trace can include a timestamp of when each of the packets was sent/or received by the communication device 101A. The other communications devices 101B-101N may also contain a network sniffer 207.

The packet log file 104A can be a running packet log file that contains the sequence of when packets were sent/received and when the different user interactions/timer events occurred. The contents of the packet log file 104A can be displayed in the order that each event/packet occurred (See FIG. 6 as an illustrative example).

The network management system 220 can gather log files from different communication devices 101A-101N to build a composite packet trace. For example, the communication device 101A can send the packet log file 104A to the network management system 220. The packet log file can be sent periodically or sent based on receiving a command from the network management system 220. The network management system 220 can receive another packet log file 104B (not shown) from the communication device 101B. The network management system 220 can display the two packet log files 104A/104B based on the timestamps in the two packet log files 104A/104B. A network technician can use this information to debug problems in a communication session between the communication device 101A and the communication device 101B.

Figure 3:
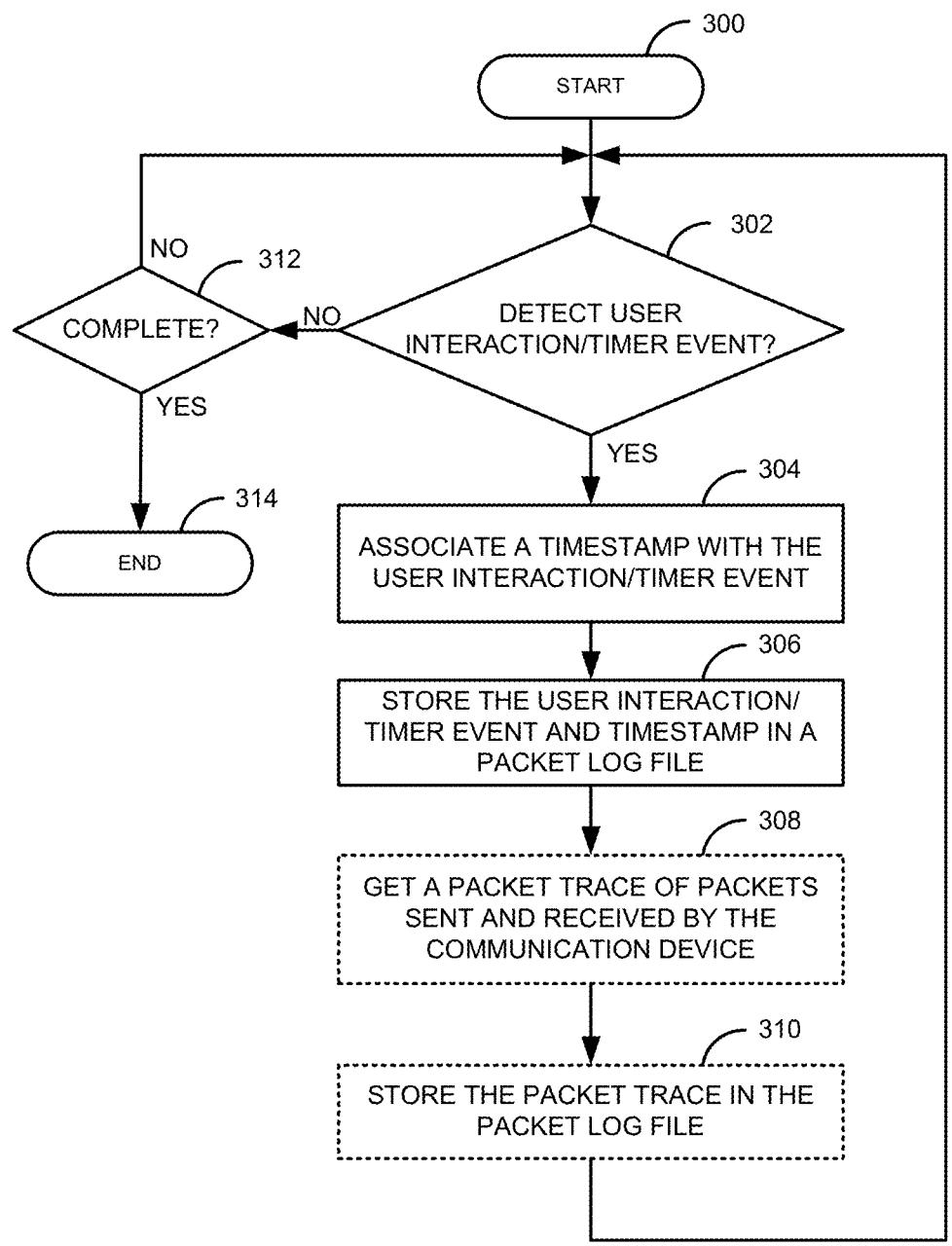
FIG. 3 is a flow diagram of a method for capturing events in a communication device.
Figure 4:
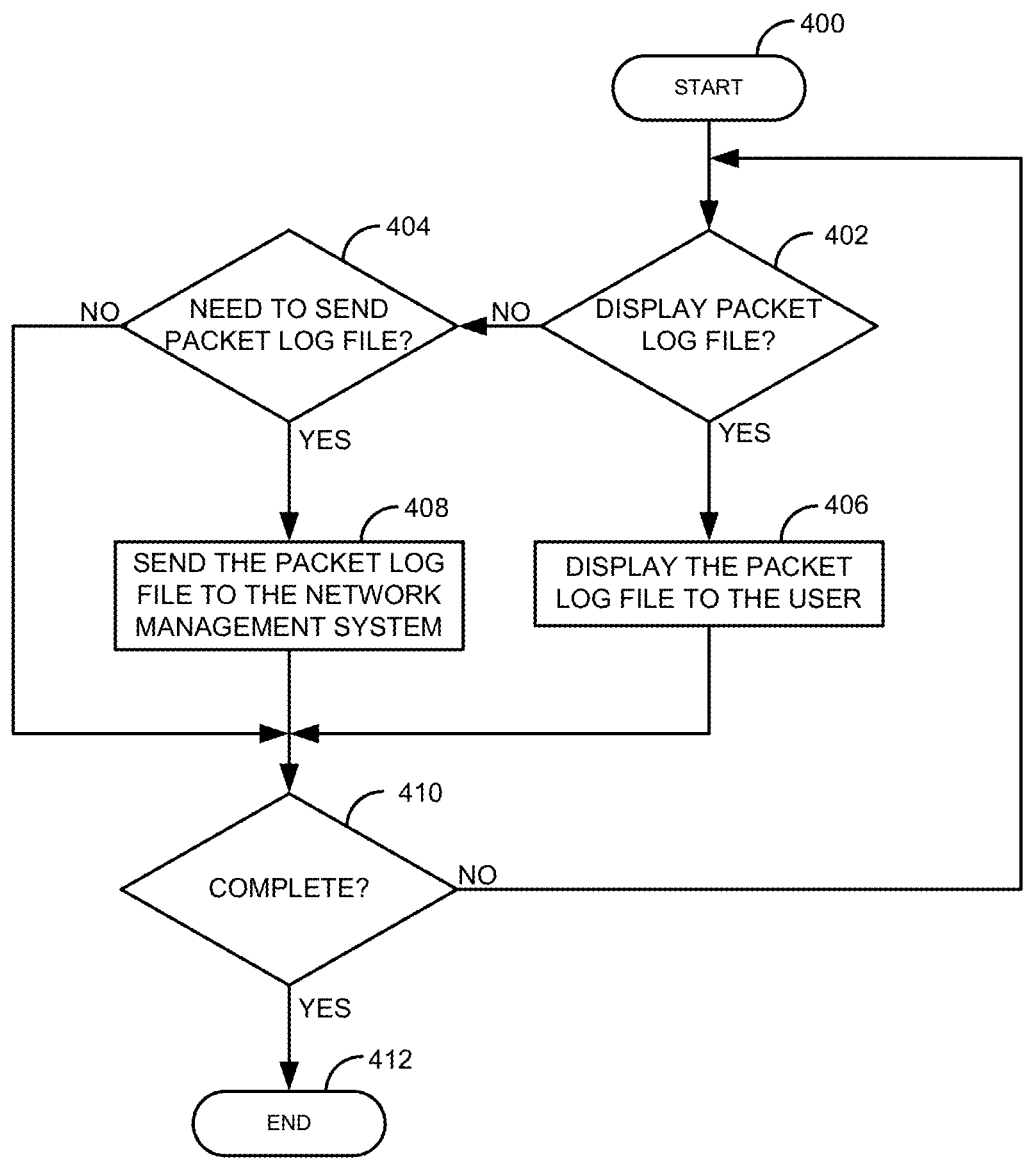
FIG. 4 is a flow diagram of a method for displaying and sending packet log files.
Figure 5:
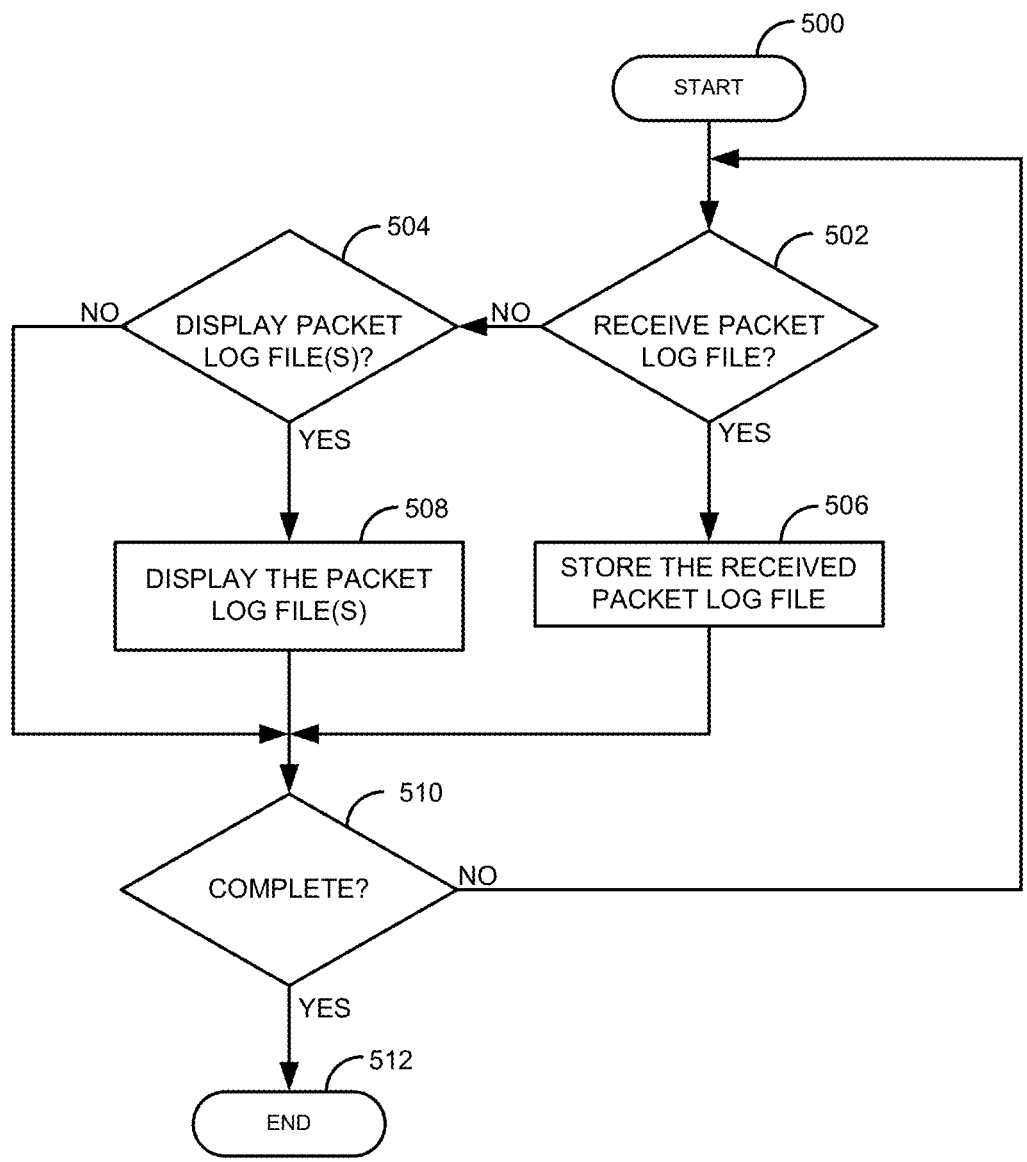
FIG. 5 is a flow diagram of a method for receiving and displaying packet log files in a network management system.

FIG. 3 is a flow diagram of a method for capturing events in a communication device. Illustratively, the communication devices 101A-101N, the event detector 102A, the logging module 103A, the user interface 105A, the timer module 106A, the network sniffer 207A, and the network management system 220 are stored-program-controlled entities, such as a computer or processor, which performs the methods of FIGS. 3-5 and the processes described herein by executing program instructions stored in a tangible computer readable storage medium, such as a memory or disk. Although the methods described in FIGS. 3-5 are shown in a specific order, one skilled in the art would recognize that the steps in FIGS. 3-5 may be implemented in different orders and/or be implemented in a multi-threaded environment. Moreover, various steps may be omitted or added based on implementation.

The process starts in step 300. The process determines in step 302 if a user interaction and/or timer event was detected. If a user interaction and/or the timer event are not detected in step 302, the process determines if the process is complete in step 312. If the process is complete in step 312, the process ends in step 314. If the process is not complete in step 312, the process goes to step 302.

If the process determines in step 302 that a user interaction and/or timer event was detected, the process associates 304 a timestamp with the user interaction and/or timer event. The process stores 306 the user interaction/timer event the timestamp in the packet log file. Optionally, the process can also get 308 a packet trace of packets sent and received by the communication device. The process stores 310 the packet trace in the packet log file. The process goes to step 302.

In the above example, steps 308 and 310 are shown as implemented when a user interaction/timer event occurs. However, in another embodiment, the process of step 308 and 310 may be implemented on a separate process (thread) that gets 308 the packets and stores 310 the packets as the packets are sent or received.

Steps 308 and 310 do not have to be implemented in the communication device. In one embodiment, the communication device only captures the user interactions/timer events. The packet log file of the communication device can be combined with another packet log file of a communication system in the network that contains the packets that are sent to and from the communication device.

FIG. 4 is a flow diagram of a method for displaying and sending packet log files. The process starts in step 400. The process determines in step 402 if a user of the communication device wants to display the packet log file. If the user wants to display the packet log file, the process displays 406 the packet log file to the user. The process goes to step 410. How the packet log file is displayed can be accomplished in various ways. For example, the packet log file can be formatted for display based on configuration information, such as to display only parts of the packet log file or to display specific packets in of the packet log file based on an identifier (e.g., a source or destination address).

If the user does not want to display the packet log file in step 402, the process determines in step 404 if there is a need to send the packet log file to a network management system. The need to send the packet log file to the network management system may be based on a timer that periodically sends the packet log file to the network management system or based on receiving a message from the network management system to send the packet log file. If there is a need to send the packet log file in step 404, the process sends 408 the packet log file to the network management system and process goes to step 410. If the there is not a need to send the packet log file in step 404, the process goes to step 410.

In step 410, the process determines if the process is complete. If the process is complete in step 410, the process ends in step 412. Otherwise, if the process is not complete in step 410, the process goes to step 402.

FIG. 5 is a flow diagram of a method for receiving and displaying packet log files in a network management system. The process of FIG. 5 is from the point of view of the network management system. The process starts in step 500. The process determines in step 502 if a packet log file has been received. If a packet log file has been received in step 502, the process stores 506 the received packet log file and the process goes to step 510.

If a packet log file was not received in step 502, the process determines in step 504 is a user wants to display the packet log file(s). If the user wants to display the packet log file(s) in step 504, the process displays 508 the packet log file(s) and then goes to step 510. The network management system may have received multiple packet log files from other communication devices, network sniffers, communication systems, and/or the like. The packet log file(s) can be displayed in various ways to the user. For example, the packet log file(s) can be displayed in the order they were received, based on an identifier (e.g., a source or destination address), based on a communication session identifier, based on the timestamps, and/or the like. If the user does not want to display the packet log files in step 504, the process goes to step 510.

In step 510, the process determines if the process is complete. If the process is complete in step 510, the process ends in step 512. Otherwise, if the process is not complete in step 510, the process goes to step 502.

Figure 6:
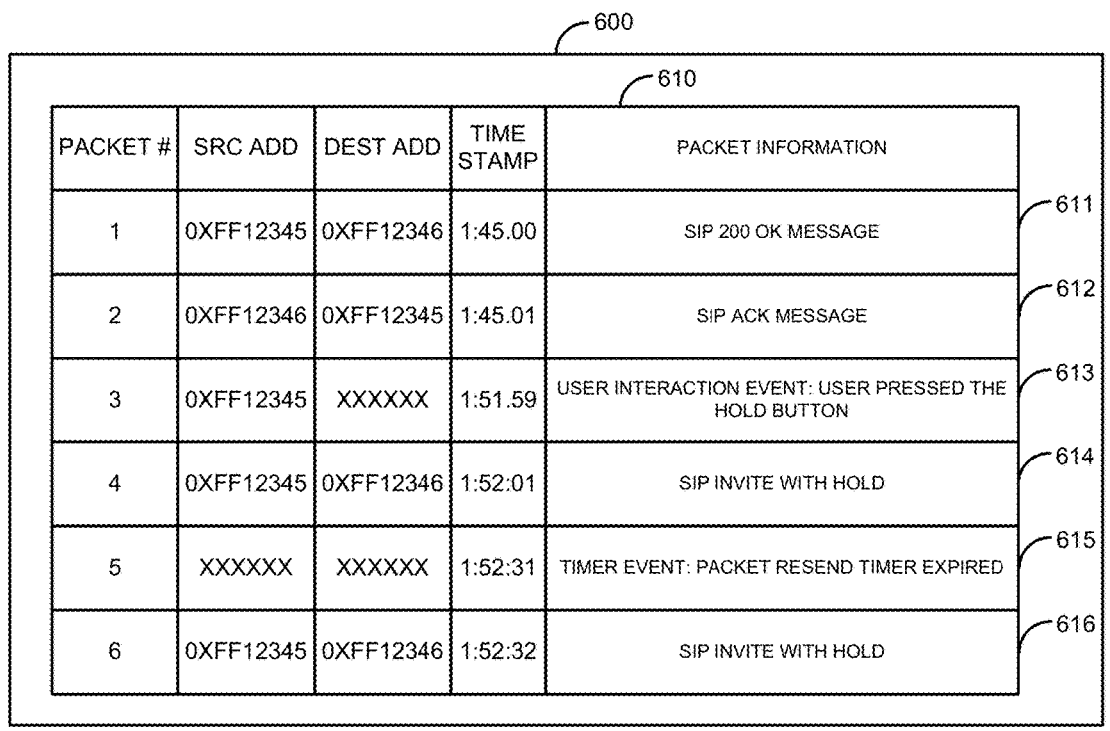
FIG. 6 is a diagram of a packet trace that contains events captured in a communication device.

FIG. 6 is a diagram of a packet trace that contains events captured in the communication device 101A. A packet trace window 610 is a display of a packet log file 104A. In this example, the communication device 101A is represented in the packet log file 104A with an address of 0XFF12345. The communication device 101A is in a Session Initiation Protocol (SIP) communication session with the communication device 101B, which has an address of 0XFF12346. The packet trace window 610 displays the packet number (based on the timestamp). The packet trace window 610 shows the source address of the sent and received packets, the timestamp associated with the sent and received packets, and information associated with the packet.

The packet trace window 610 comprises information that represents packets 611, 614, and 616 that were sent from the communication device 101A, a received packet 612 that was sent from the communication device 101B, a user interaction 613 at the communication device 101A, and a timer event 615 in the communication device 101A.

In chronological order, the packet trace window 610 shows that the communication device 101A sent a SIP 200 OK message at 1:45.00 in the packet 611. The communication device 101A received a SIP ACK message from the communication device 101B at 1:45.01 in the packet 612. At 1:51.59, the user pressed the hold button on the communication device 101A in the packet 613. The communication device 101A sent a SIP INVITE with HOLD at 1:52.01 to the communication device 101B in the packet 614. At 1:52:31, a packet resend timer expired in the communication device 101A in the packet 615. The packet resend timer expired because the communication device 101A did not receive a response to the SIP INVITE with HOLD (packet 614). The communication device 101A resends the SIP INVITE with HOLD at 1:52:32 in the packet 616.

The user interaction packet 613 and the timer event packet 615 were stored in the packet log file as a malformed packet. A malformed packet is a packet that has a bogus destination and/or source address. A bogus address is where there is no source and/or destination address or where there is an invalid source and/or destination address. In this example, the source address 0XFF12345 of the displayed malformed packet 613 has the source address of the communication device 101A, while the XXXXXX in the destination address represents a missing or invalid address. In malformed packet 615, both the source and destination address are represented by the XXXXXX. The user interaction (packet 613) and the timer event (packet 615) are stored in the same format as real packets so that they can be viewed like a regular packet.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   detecting, by a processor, one of a user interaction or a timer event in a first communication device;
   in response to detecting the one of the user interaction or the timer event, associating, by the processor, a first timestamp with the one of the user interaction or the timer event; and
   in response to detecting the one of the user interaction or the timer event in the first communication device, storing, by the processor on the first communication device, the one of the user interaction or the timer event, and the first timestamp in a first packet log file associated with the first communication device, wherein the at least of one of the user interaction or the timer event and the associated first timestamp are stored separately in the first packet log file from information associated with packets sent on a network and wherein the first packet log file also comprises one or more packets sent on the network, each with separate timestamps.

2. The method of claim 1, wherein the stored one of the user interaction or the timer event is an event that is related to a malformed packet and wherein event related the malformed packets is stored in the first packet log file as a malformed packet that comprises at least a bogus destination address.

3. The method of claim 1, wherein the user interaction is detected and wherein the first packet log file is displayed on the first communication device in a sequence of when the user interaction occurred in relation to the trace of packets.

4. The method of claim 1, wherein the timer event is detected and wherein the first packet log file is displayed in a sequence of when the timer event occurred in relation to the trace of packets.

5. The method of claim 1, wherein the user interaction is detected and wherein the user interaction is one of: a keypad press, a typing on a keyboard, a voice command, or a gesture.

6. The method of claim 1, wherein the user interaction is detected and wherein the user interaction is provided to the user comprising one of: an audio indication of a status, an indication of a caller ID, a ringing, a dial tone, or a voice mail indicator.

7. The method of claim 1, wherein the timer event is detected and wherein the timer event is one of: a power conservation timer event, a back-off timer event, an input response timer event, or a watchdog timer event.

8. A communication device comprising:
   a microprocessor; and
   a computer readable medium, coupled with the microprocessor and comprising
   microprocessor readable and executable instructions that program the microprocessor to execute:
   an event detector that detects one of a user interaction or a timer event in the communication device and in response to detecting the one of the user interaction or the timer event, associates a first timestamp with the one of the user interaction or the timer event; and
   a logging module that stores, on the communication device, the one of the user interaction or the timer event, and the first timestamp in a packet log file associated with the communication device in response to detecting the one of the user interaction or the timer event, wherein the at least of one of the user interaction or the timer event and the associated first timestamp are stored separately in the packet log file from information associated with packets sent on a network and wherein the first packet log file also comprises one or more packets sent on the network, each with separate timestamps.

9. The communication device of claim 8, wherein the stored at of the user interaction or the timer event is an event that is related to a malformed packet and wherein event related the malformed packets is stored in the packet log file as a malformed packet.

10. The communication device of claim 9 wherein the malformed packet comprises at least a bogus destination address.

11. The communication device of claim 8, further comprising a network sniffer that captures a trace of packets sent to and received by the communication device.

12. The communication device of claim 11, wherein the user interaction is detected by the event detector and wherein the packet log file is displayed in a sequence of when the user interaction occurred in relation to the trace of packets.

13. The communication device of claim 11, wherein the timer event is detected by the event detector and wherein the packet log file is displayed in a sequence of when the timer event occurred in relation to the trace of packets.

14. The communication device of claim 8, wherein the event detector detects the user interaction and wherein the user interaction is one of: a keypad press, a button push, a typing on a keyboard, a voice command, a selection by the user, or a gesture.

15. The communication device of claim 8, wherein the event detector detects the user interaction and wherein the user interaction is one of: a visual indication of a status, an audio indication of a status, a state of a display, a state of a status indicator, an indication of a caller ID, a ringing, a dial tone, or a voice mail indicator.

16. The communication device of claim 8, wherein the event detector detects the timer event and wherein the timer event is a power conservation timer event on the communication device.

17. The communication device of claim 8, wherein the event detector detects the timer event and wherein the timer event is one of: a power conservation timer event, a packet resend timer event, a packet response time event, a back-off timer event, an input response timer event, or a watchdog timer event.

18. The communication device of claim 8, wherein the timer event is detected and wherein the timer event is a watchdog timer event on the communication device.

19. The communication device of claim 8, wherein the user interaction is detected and wherein the user interaction is a push of a speakerphone button on the communication device.

20. The communication device of claim 8, wherein the user interaction is detected and wherein the user interaction is an indication of a caller ID on the communication device.

* * * * *